US007581470B1

(12) United States Patent
Huang

(10) Patent No.: US 7,581,470 B1
(45) Date of Patent: Sep. 1, 2009

(54) UNIVERSAL SCREWDRIVER BIT SET

(76) Inventor: Jui-Min Huang, No. 680, Dadun 12th St., Nantun District, Taichung City (TW)

( * ) Notice: Subject to any disclaimer, the term of this patent is extended or adjusted under 35 U.S.C. 154(b) by 0 days.

(21) Appl. No.: 12/277,298

(22) Filed: Nov. 25, 2008

(51) Int. Cl.
*B25B 23/00* (2006.01)
*B23B 31/22* (2006.01)

(52) U.S. Cl. .......................................... 81/438; 279/22

(58) Field of Classification Search .................. 81/438, 81/436, 177.85; 279/22, 29, 30, 75, 905
See application file for complete search history.

(56) References Cited

U.S. PATENT DOCUMENTS 6,311,989 B1 * 11/2001 Rosanwo ..................... 279/75
6,637,755 B2 * 10/2003 Chen et al. .................... 279/22
6,722,667 B2 * 4/2004 Cantlon ....................... 279/22
7,424,841 B2 * 9/2008 Liu ............................. 81/438
7,448,302 B2 * 11/2008 Huang ......................... 81/438

* cited by examiner

*Primary Examiner*—Hadi Shakeri
(74) *Attorney, Agent, or Firm*—Egbert Law Offices PLLC

(57) ABSTRACT

The present invention provides a universal screwdriver bit set, including a main rod, control bushing, movable tube and movable magnetic rod. An abutting end and a recessing slot are placed externally onto the movable tube. The movable magnetic rod is assembled into the recessing slot of movable tube in a limited sliding expansion state. The movable magnetic rod is provided with a magnetic head and a drive rod. There is a spacing fall between the recessed magnetic head and abutting end of the movable tube. Either a single-ended or double-ended screwdriver bit, or the lateral bead locating flanges with some offsets, can be positioned securely, such that the universal screwdriver bit set allows for assembly of screwdriver bits with at least 4 currently available insertion ends, thereby improving the adaptability and applicability.

3 Claims, 7 Drawing Sheets

UNIVERSAL SCREWDRIVER BIT SET

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention relates generally to a screwdriver bit set, and more particularly to an innovative bit set, which enables interpolation and assembly of at least four types of screwdriver bits.

2. Description of Related Art Including Information Disclosed Under 37 CFR 1.97 and 37 CFR 1.98

The coupling position of common electric screwdriver bits can be adjusted for assembly and replacement of different screwdriver bits, however, it is possible that the adapter of an electronic screwdriver bit cannot be inserted into the screw in a narrow space due to the external diameter of the adapter being too large.

Therefore, a screwdriver bit set has been developed in timely response to the aforementioned issues. One end of a screwdriver bit set is generally a coupling rod for assembly onto the adapter, and the other end is extended to a preset length and provided with a slot for insertion of the screwdriver bit. However, it is found from actual application that the currently available screwdriver bits from different manufacturers have various insertion ends, e.g. at a minimum 4 dimensions of insertion ends in view of the spacing from the end surface to the lateral bead locating flange. Yet, only one or two models are considered in the structure of a typical screwdriver bit set, leading to lack of adaptability in the applications, possible failure of assembly of screwdriver bits and screwdriver bit set, as well as adverse impact on the applicability of the screwdriver bit set.

Thus, to overcome the aforementioned problems of the prior art, it would be advancement in the art to provide an improved structure that can significantly improve efficacy.

Therefore, the inventor has provided the present invention of practicability after deliberate design and evaluation based on years of experience in the production, development and design of related products.

BRIEF SUMMARY OF THE INVENTION

Based upon the unique structure of the present invention, the movable tube of the "universal screwdriver bit set" is externally provided with an abutting end and a recessing slot. The movable magnetic rod can be slidably and flexibly assembled into the movable tube recessing slot. The movable magnetic rod is provided with a magnetic head and drive rod. The magnetic head in a recessed state has a spacing fall with the abutting end of the movable tube, either single-ended or double-ended screwdriver bit, or the lateral bead locating flanges with some offsets, can be positioned securely, such that the universal screwdriver bit set allows for assembly of screwdriver bits with at least 4 currently available insertion ends, thereby improving the adaptability and applicability.

Although the invention has been explained in relation to its preferred embodiment, it is to be understood that many other possible modifications and variations can be made without departing from the spirit and scope of the invention as hereinafter claimed.

DETAILED DESCRIPTION OF THE INVENTION

The features and the advantages of the present invention will be more readily understood upon a thoughtful deliberation of the following detailed description of a preferred embodiment of the present invention with reference to the accompanying drawings.

Figure 1:
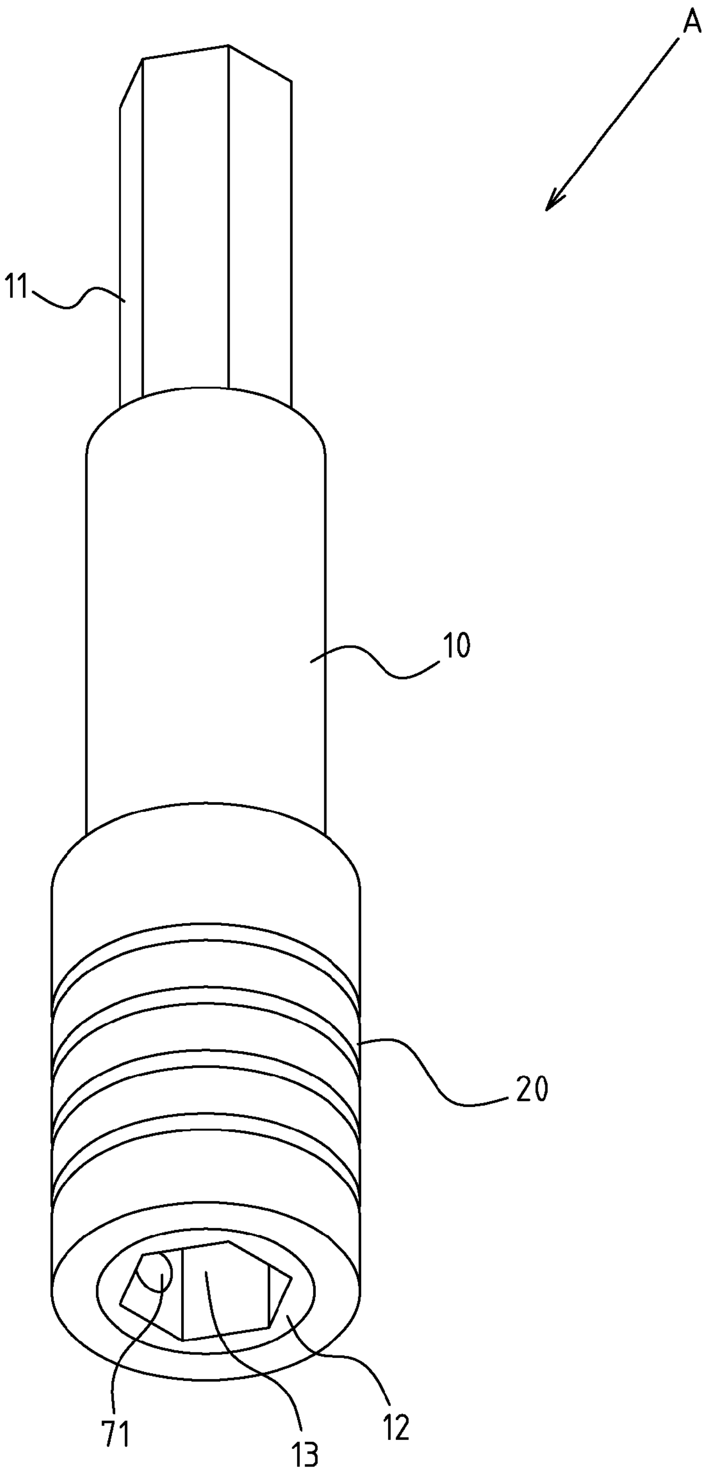
FIG. 1 shows an assembled perspective view of the preferred embodiment of the present invention.
Figure 2:
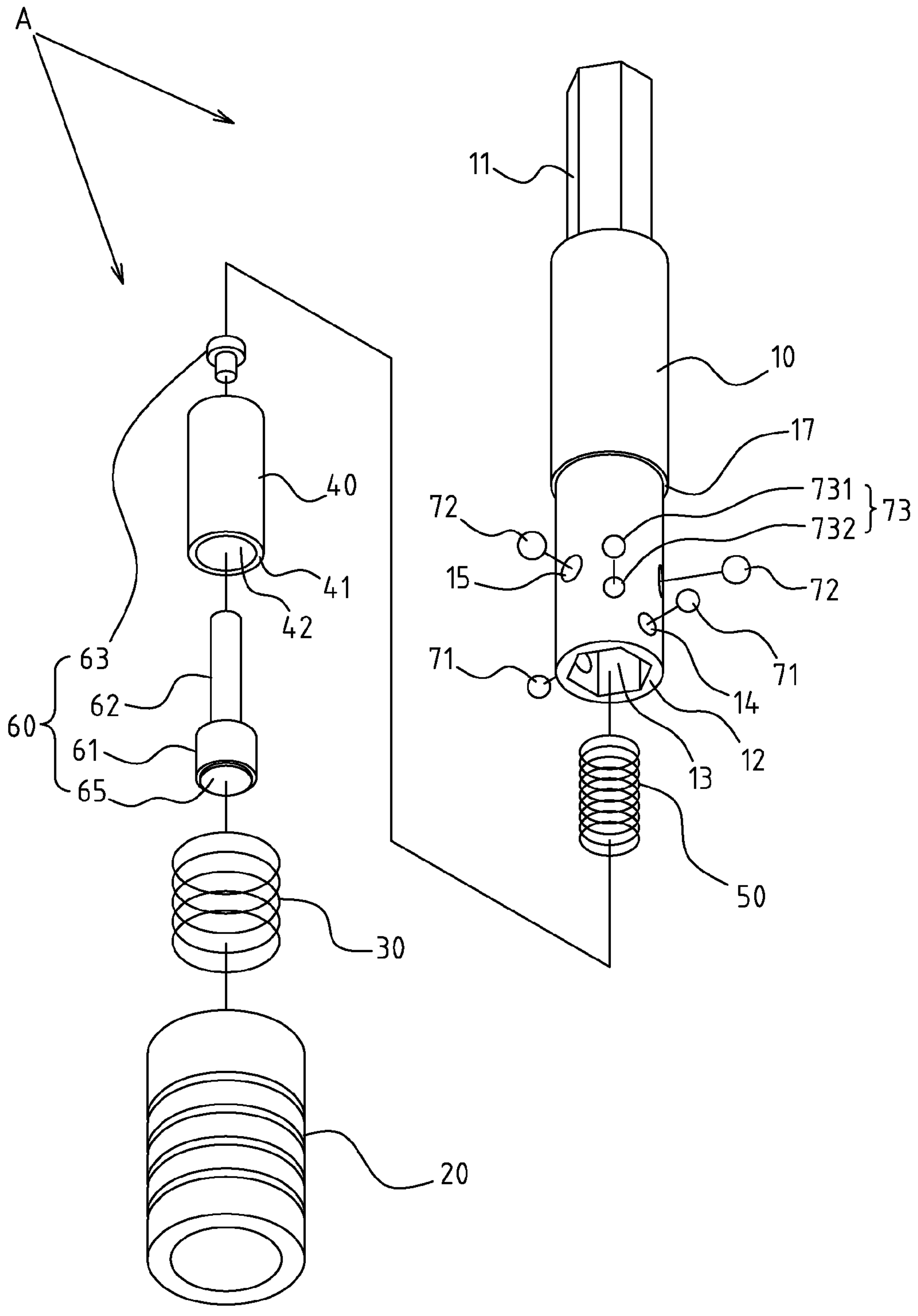
FIG. 2 shows an exploded perspective view of the preferred embodiment of the present invention.
Figure 3:
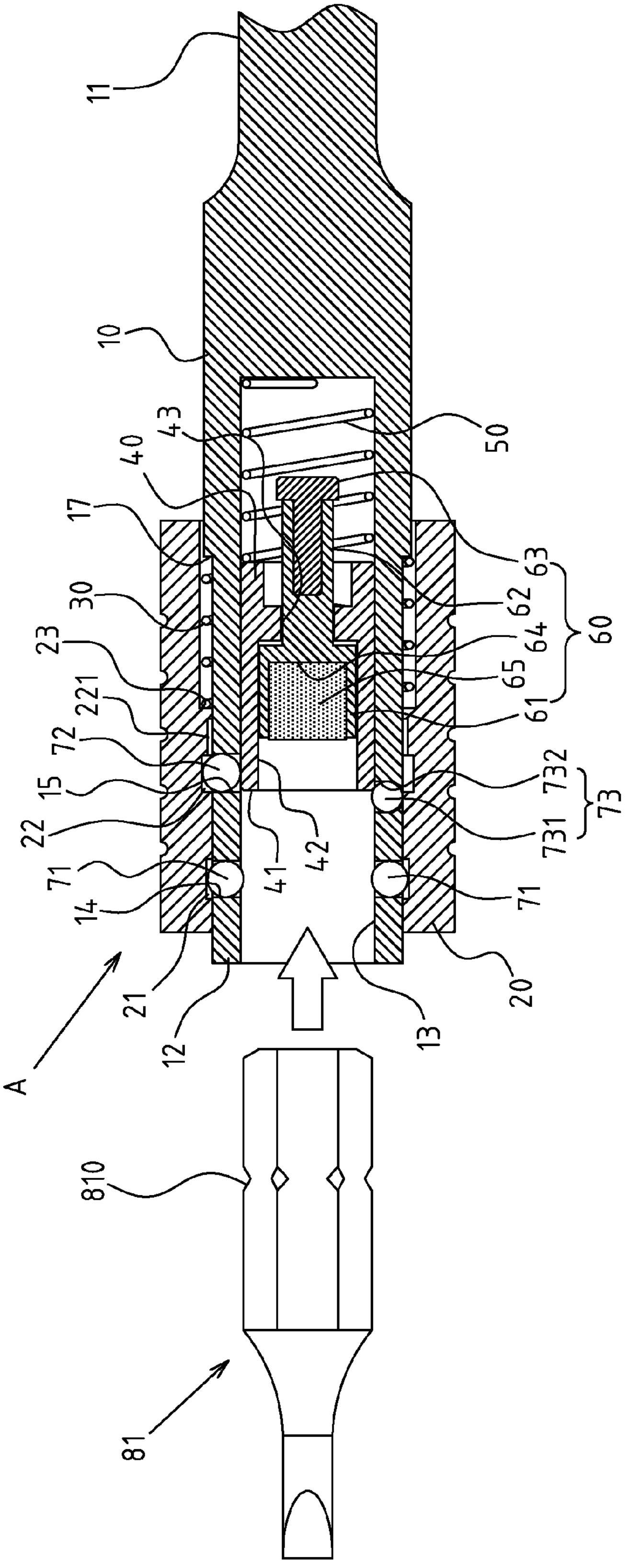
FIG. 3 shows an assembled sectional view of the preferred embodiment of the present invention.

FIGS. 1-3 depict preferred embodiments of universal screwdriver bit set of the present invention. The embodiments are provided only for explanatory purposes with respect to the patent claims.

The universal screwdriver bit set A comprises a hollow main rod 10, containing a coupling end 11 and a screwdriver bit insertion end 12. A recessed screwdriver bit slot 13 (with a hexagonal profile) is formed at the screwdriver bit insertion end 12. A first bead hole 14 and a second bead hole 15 are arranged at interval onto the preset location on the wall of the screwdriver bit slot 13.

The set A also includes a control bushing 20, which is sleeved onto the periphery of the screwdriver bit insertion end 12 of the main rod 10. A recessed circular trough 21 and a locked circular trough 22 are arranged alternatively on the inner wall of the control bushing 20.

A first elastic spring 30 is assembled between the control bushing 20 and main rod 10, used to support flexibly the control bushing 20 towards the screwdriver bit insertion end 12. The first elastic spring 30 of the preferred embodiment is made of a helical spring. Circular shoulders 17, 23 are arranged correspondingly on the control bushing 20 and main rod 10, so that the first elastic spring 30 is assembled between two circular shoulders 17, 23.

There is also a movable tube 40, which resembles a cylinder, assembled into the screwdriver bit slot 13 of the main rod 10 in a limited sliding state. An abutting end 41 and a recessing slot 42 are placed externally onto the movable tube 40. A through-hole 43 is formed at the center of the recessing slot 42.

A second elastic spring 50 is made of a helical spring, assembled between the inner end of movable tube 40 and the inner wall of screwdriver bit slot 13, and used to support flexibly the movable tube 40 towards the screwdriver bit slot 13.

A movable magnetic rod 60 is assembled into the recessing slot 42 of the movable tube 40 in a limited sliding expansion state. The movable magnetic rod 60 is provided with a magnetic head 61 and a drive rod 62. When the magnetic head 61 is in a predefined recessing state, there is a spacing fall with the abutting end 41 of the movable tube 40. The drive rod 62 then penetrates loosely the through-hole 43 of the recessing slot 42. At the inner end of the drive rod 62, an expanded limit portion 63 is formed by combining a fixed T-column or bolt. Additionally, a magnet 65 is embedded onto the magnetic head 61 provided a tank 64 is arranged on the surface.

A first group of locating beads 71 is assembled into the first bead hole 14 on the wall of screwdriver bit slot 13. The first group of locating beads 71 can be pressed by the inner wall of the control bushing 20 for snapping and locating inwards the screwdriver bit 81. When the recessed circular trough 21 on the inner wall of the control bushing 20 is aligned with the first group of locating beads 71, the first group of locating beads 71 are protruded to release the screwdriver bit 81.

A second group of locating beads 72 are assembled into the second bead hole 15 on the wall of the screwdriver bit slot 13. The second group of locating beads 72 can be supported by the movable tube 40 and snapped into the locked circular trough 22 on the inner wall of the control bushing 20.

An inner tube limitation member 73 limits the movable tube 40 sliding towards the screwdriver bit slot 13. The inner tube limitation member 73 of the preferred embodiment is made of a locating bead 731, so that a bead accommodating hole 732 on the wall of the screwdriver bit slot 13 could accommodate the locating bead 731. The locating bead 731 can be pressed by the inner wall of the control bushing 20 for snapping inwards onto the abutting end 41 of the movable tube 40.

Figure 5:
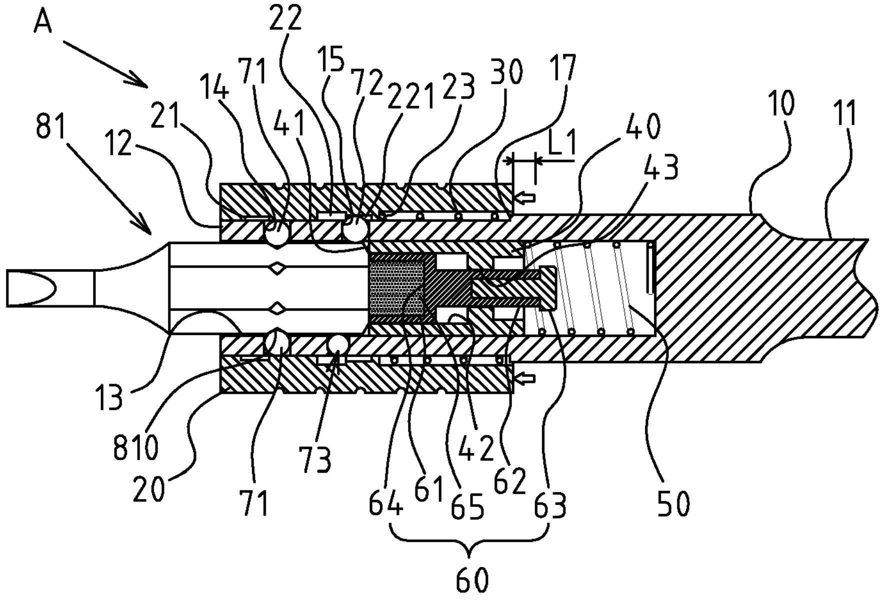
FIG. 5 shows another sectional view of the present invention with the screwdriver bit being inserted.

Referring to FIG. 3, at one side of the locked circular trough 22 of the control bushing 20, a recessed limitation slot 221 is arranged to lock the second group of locating beads 72 so as to prevent the maximum sliding and disengagement of the control bushing 20 (shown in FIG. 5).

Based on above-specified structures, the present invention is operated as follows:

Referring first to FIG. 3, the universal screwdriver bit set A isn't yet inserted into the screwdriver bit 81. In such a case, the movable tube 40 is supported outwards by the second elastic spring 50, then the second group of locating beads 72 are supported and snapped into the locked circular trough 22 on the inner wall of the control bushing 20, realizing the positioning of the control bushing 20. In such a case, the first elastic spring 30 is slightly squeezed by two circular shoulders 17, 23 to accumulate its elastic force. On the other hand, the first group of locating beads 71 are aligned with the recessed circular trough 21 on the inner wall of the control bushing 20, thus achieving a protruding or recessing state.

Figure 4:
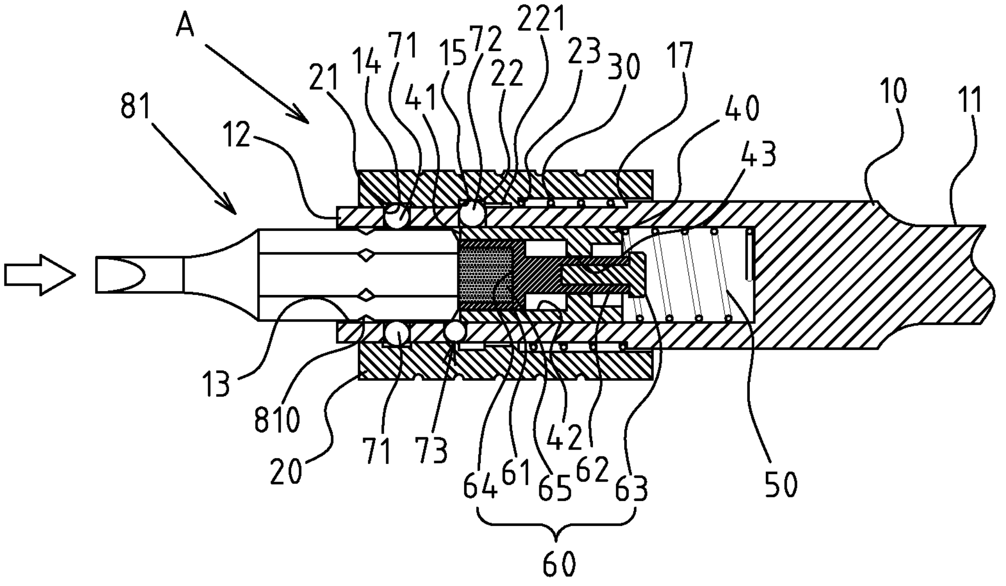
FIG. 4 shows a sectional view of the present invention with the screwdriver bit being inserted.

Referring also to FIGS. 4 and 5, when the screwdriver bit 81 is inserted into predefined depth of screwdriver bit slot 13 on the screwdriver bit insertion end 12 of the main rod 10, the abutting end 41 is pushed to make the movable tube 40 slide inwards. Meanwhile, the second elastic spring 50 is squeezed to accumulate elastic force, so that the second group of locating beads 72 is recessed slightly and disengaged from the locked circular trough 22 of the control bushing 20. In such a case, the control bushing 20 will slide forwards to a predefined distance under the elastic release of first elastic spring 30 (shown by L1 in FIG. 5). With the forward shift of the control bushing 20 and insertion of the screwdriver bit 81, the first group of locating beads 71 can be properly snapped onto the bead locating flange 810 at one side of the screwdriver bit 81. Moreover, with the forward shift of the control bushing 20, the recessing state of the first group of locating beads 71 will be pressed by the inner wall of the control bushing 20, thus positioning robustly the screwdriver bit 81.

Figure 6:
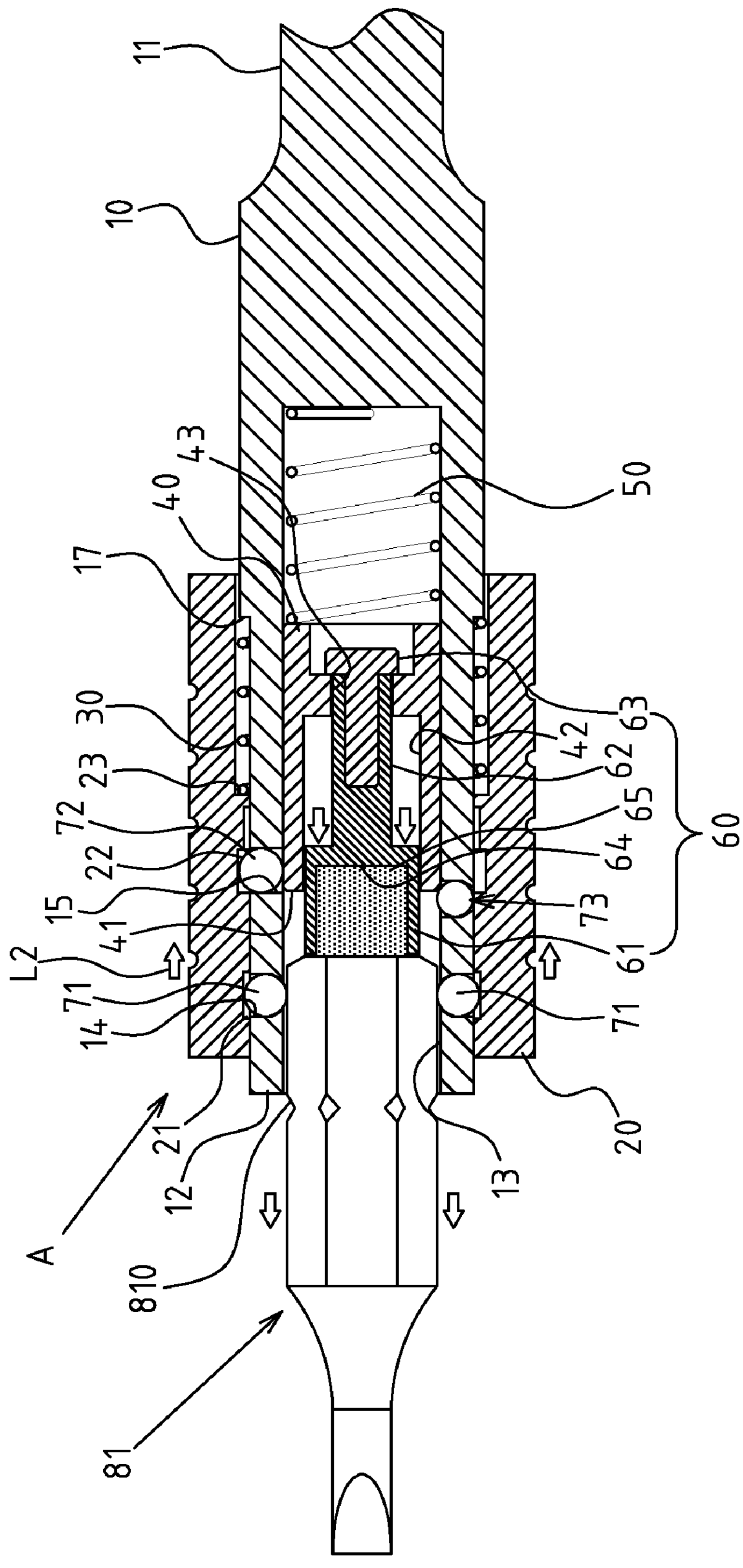
FIG. 6 shows a sectional view of the present invention with the screwdriver bit being released.

Referring also to FIG. 6, when the screwdriver bit 81 is to be released, it is only required to push backwards the control bushing 20 (indicated by L2), thus realizing the state disclosed in FIG. 4. Namely, the first group of locating beads 71 can be protruded into the recessed circular trough 21 of the control bushing 20 so as to release the screwdriver bit 81. In such a case, with the elastic release of the second elastic spring 50, the movable tube 40 will be pushed outwards to allow for protruding of the screwdriver bit 81. The insertion end of the screwdriver bit 81 will be adsorbed by the magnetic head 61 of the movable magnetic rod 60 without disengagement.

Figure 7:
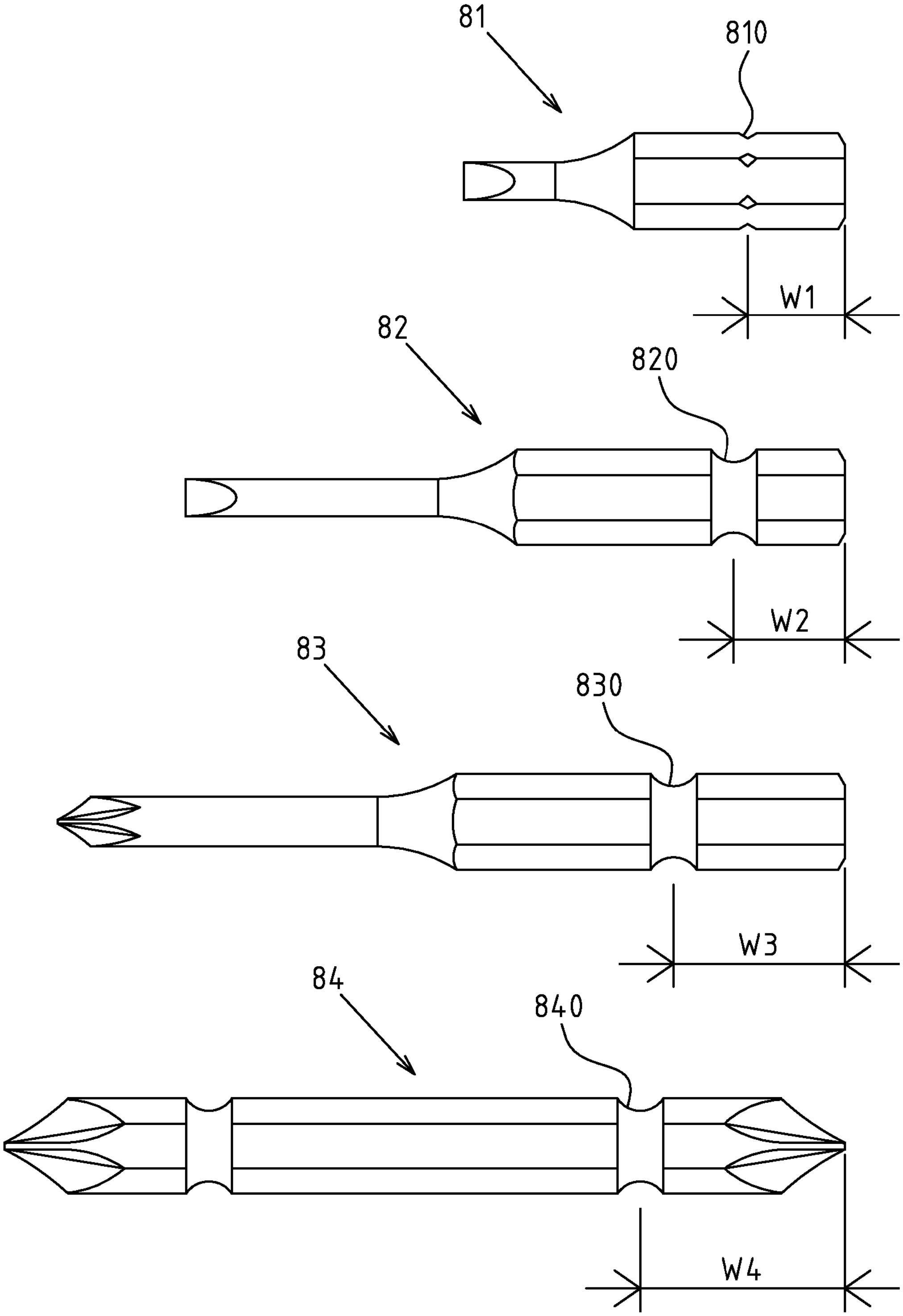
FIG. 7 shows a schematic view of a comparison of different screwdriver bits of the present invention that can be inserted into the universal screwdriver bit set.

As for the universal screwdriver bit set A of the present invention, the screwdriver bits with at least 4 available insertion ends can be assembled as shown in FIG. 7. The difference of 4 screwdriver bits 81, 82, 83, 84 lies in varying spaces (W1, W2, W3, W4) from the insertion ends to the lateral bead locating flange 810, 820, 830, 840.

Figure 8:
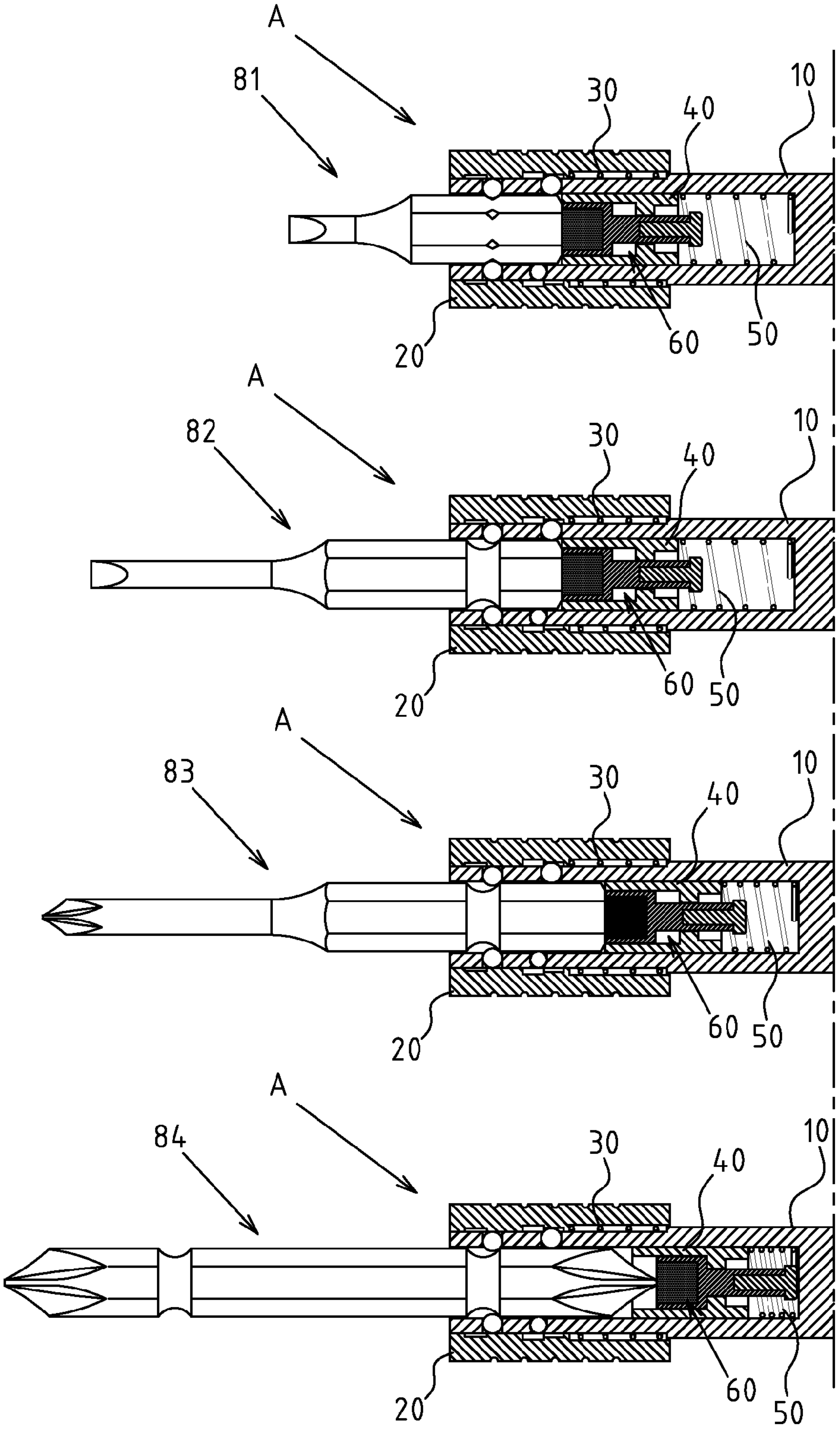
FIG. 8 shows a sectional view of the comparison of the present invention to different screwdriver bits assembled and inserted into the universal screwdriver bit set.

As mentioned above, these 4 screwdriver bits 81, 82, 83, 84 are assembled onto the universal screwdriver bit set A of the present invention as shown in FIG. 8. There exist varying spaces W1, W2, W3 from the insertion end of three single-ended screwdriver bits 81, 82, 83 to the lateral bead locating flanges 810, 820, 830, enabling automatic adjustment with the sliding characteristics of the movable tube 40. The space W4 from the conical insertion end of a double-ended screwdriver bit 84 to its lateral bead locating flange 840 is much bigger than the other three ones. So, the magnetic head 61 of the movable magnetic rod 60 can be recessed into the abutting end 41 of the movable tube 40, such that the conical insertion end of the screwdriver bit 84 can be further extended into the movable tube 40, thereby locating securely and accurately the bead locating flange 840.

I claim:

1. A universal screwdriver bit set, comprising:

a hollow main rod, containing a coupling end and a screwdriver bit insertion end;

a recessed screwdriver bit slot being formed at said screwdriver bit insertion end;

a first bead hole and a second bead hole, being arranged at intervals onto a preset location on a wall of the screwdriver bit slot;

a control bushing, sleeved onto a periphery of the screwdriver bit insertion end of the main rod;

a recessed circular trough and a locked circular trough being arranged alternatively on an inner wall of said control bushing, said locked circular trough being laterally provided with a recessed limitation slot;

a first elastic spring, assembled between said control bushing and the main rod, flexibly supporting said control bushing towards the screwdriver bit insertion end;

a movable tube, being assembled into the screwdriver bit slot of the main rod in a limited sliding state and having an abutting end and a recessing slot placed externally on said movable tube;

a through-hole being formed on a center of the recessing slot;

a second elastic spring, being assembled between the inner end of movable tube and the inner wall of screwdriver bit slot, flexibly supporting the movable tube towards the screwdriver bit slot;

a movable magnetic rod, being assembled into the recessing slot of the movable tube in a limited sliding expansion state and being provided with a magnetic head and a drive rod, said abutting end of said movable tube having a spacing fall when the magnetic head is in a predefined recessing state, said drive rod then loosely penetrating the through-hole of the recessing slot and having an expanded limit portion is formed at the inner end thereof;

a first group of locating beads, being assembled into the first bead hole on the wall of screwdriver bit slot and being pressed by the inner wall of the control bushing for snapping and locating inwards the screwdriver bit, the first group protruding to release the screwdriver bit when the recessed circular trough on the inner wall of the control bushing is aligned with the first group of locating beads;

a second group of locating beads, being assembled into the second bead hole on the wall of the screwdriver bit slot and being supported by the movable tube and snapped into the locked circular trough on the inner wall of the control bushing; and an inner tube limitation member, limiting the movable tube sliding towards the screwdriver bit slot.

2. The screwdriver bit set defined in claim 1, wherein the first elastic spring is comprised a helical spring, said control bushing and main rod having circular shoulders arranged correspondingly thereon, said first elastic spring being assembled between two circular shoulders of the control bushing and main rod.

3. The screwdriver bit set defined in claim 1, wherein the inner tube limitation member is comprised a locating bead, said locating bead being accommodated in a bead accommodating hole on the wall of the screwdriver bit slot and being pressed by the inner wall of the control bushing for snapping inwards onto the abutting end of the movable tube.

* * * * *